Jan. 14, 1958 — R. C. LEWIS — 2,820,161
ELECTROMAGNETIC VIBRATION GENERATOR
Filed June 1, 1954
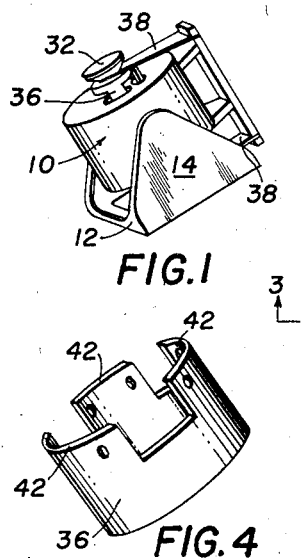
FIG.1
FIG.4
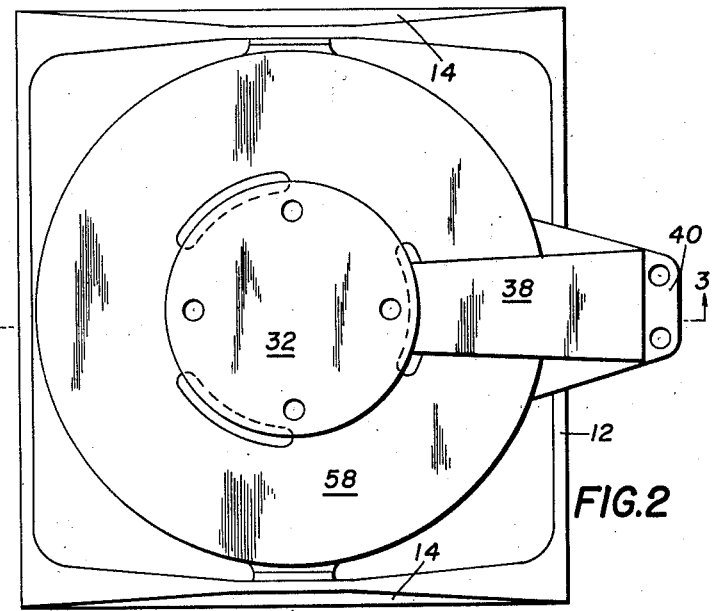
FIG.2
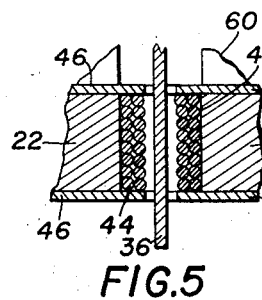
FIG.5
FIG.6
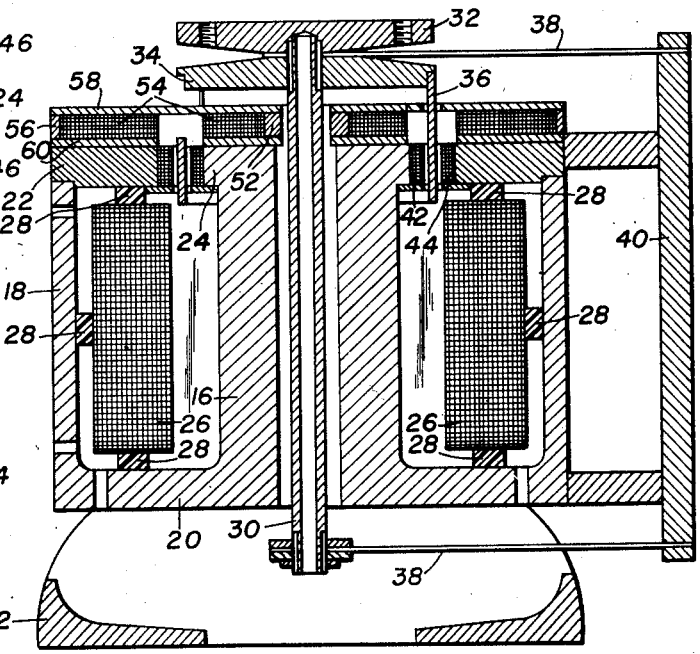
FIG.3
INVENTOR
ROBERT C. LEWIS
BY George W. Price
ATTORNEY

2,820,161
ELECTROMAGNETIC VIBRATION GENERATOR

Robert C. Lewis, Winchester, Mass., assignor to The Calidyne Company, Winchester, Mass., a copartnership Application June 1, 1954, Serial No. 433,673

8 Claims. (Cl. 310—27)

The problem of reducing the effects of leakage flux from the air gap of a vibration generator has been a troublesome one, particularly when devices, such as a vacuum tube or a sensitive relay, which can tolerate flux density of only a few gausses, are to be tested. One of the most satisfactory solutions to this problem is the positioning of the test load carrying table upon the opposite side of the core structure from the air gap so that the iron of the core structure itself acts as a shield, as is described in United States Letters Patent No. 2,599,036 to Efromson and Lewis. A further reduction in residual flux is obtained by the use of compensating coils such as are shown in the patent application Serial No. 420,518 to Hovnanian and Zimmer. The above improvements have been found satisfactorily to reduce the leakage and have proved commercially successful, but the separated masses of the armature coil and test table have tended to become one of the factors limiting the upper operating frequency of the generator.

Accordingly, the principal objects of this invention are to provide apparatus which will impart a reciprocating movement to a test load, in which the armature length and inertia are reduced to a minimum, which will operate at relatively high frequencies, which is rugged in construction and simple in design, and which advances the art generally.

According to the present invention, apparatus for producing a reciprocating movement in a test load comprises a core structure of a low reluctance material having at one end an air gap across which a magnetic flux is induced by a direct current winding. An axially movable armature having a coil of one or more turns through which flows an alternating current is disposed in the air gap, so that a reciprocating or vibratory movement is imparted to the connected test load. To reduce or preferably substantially nullify the leakage flux from the air gap and adjacent core structure, an auxiliary magnetic circuit is provided having a secondary air gap which is interposed between the main air gap in the core structure and the test load. An auxiliary winding produces a magnetic flux across the secondary air gap which has the same density and direction as the flux in the main air gap so that the differences in magnetomotive potential causing the main leakage flux are eliminated.

These and other objects and aspects of the invention will be apparent from the following description of a specific embodiment of the invention which refers to a drawing wherein:

Fig. 1 is an isometric view of the vibration generator;
Fig. 2 is an enlarged plan view of the generator;
Fig. 3 is an axial sectional view on line 3—3 of Fig. 2;
Fig. 4 is an isometric view of a single turn armature coil;
Fig. 5 is an enlarged fragmentary sectional view of the main air gap with a single turn armature coil therein; and
Fig. 6 is an enlarged fragmentaary view similar to Fig. 5 showing an alternative armature coil construction.

As is best shown in Figs. 1 and 3, the vibration generator has a two-piece core structure 10 of a low reluctance magnetic material, such as soft iron, which is supported from trunnion brackets 14 extending upwardly from opposite sides of a base 12. The core structure 10 consists of a central pole piece 16 (Fig. 3) and a coaxially surrounding cylindrical piece 18 which are integrally joined at their lower ends by a disc 20. A cover plate 22 having a central aperture completes the magnetic path. The wall of the aperture and the periphery of the head 24 at the upper end of the central pole piece 16 are the faces of a main air gap which is cylindrical in form. The core structure 10 is magnetized to produce a magnetic flux across the main air gap by means of a direct current winding 26 which is held in place in the cavity between the central pole piece 16 and the cylindrical piece 18 by non-magnetic spacers 28.

The armature assembly consists of an elongated member, such as the rod 30, having a table 32 at its upper end to which may be secured a test load (not shown). Immediately below the table 32 is a cylindrical spacer 34 from which depends an armature coil 36 that will be described in detail below. The armature assembly is supported for movement in an axial direction by two flexures such as the flat cantilever springs 38, the movable ends of which are secured respectively to the opposite ends of the rod 30. The fixed ends of the springs 38 are attachd to a bracket 40 which extends from the side of the core structure 10.

As is best shown in Fig. 4, the coil 36 is a ring of a low electrical resistance material such as copper, having several fingers for attaching the ring to the armature spacer 34, the fingers being formed integrally with the ring by axially disposed recesses in one end thereof. As is well known to one skilled in the art, an electrically conducting ring interposed in an alternating field will act as a shorted single turn secondary of a transformer and will have an alternating current induced therein. Such an alternating field for the ring 36 is supplied by two primary windings 42 and 44 which are carried upon the faces of the head 24 of the central pole piece 16 and the cover plate 22, respectively. The windings 42 and 44 are held in place by non-magnetic side plates 46. An alternative coil construction is shown in Fig. 6 wherein the coil 36a consists of a plurality of turns of a self-supporting conductor which are held in place by end rings 48 and 50, the upper of the rings having fingers (not shown) similar to fingers 42 for attaching the coil to the spacer 34. With the latter coil 36a primary windings such as 42 and 44 are not required if the current is introduced by means of flexible leads (not shown), or may be conductively connected in series opposition to the primary windings 42 and 44 by the flexible leads.

The above described structure is generally similar to those known to the prior art wherein the flow of an alternating current in the armature coil, either by induction or conduction, creates an alternating flux which reacts with the unidirectional flux across the main air gap in the well known manner to impart a reciprocating movement to the armature assembly and any test load (not shown) attached to the table 32. The frequency of the armature assembly movement corresponds to the frequency of the alternating current in the armature coil.

The large magnetomotive potential difference between the faces of the main air gap results in a large leakage flux in the surrounding space in which is located the test table 32 and any test load which is attached thereto. If the armature assembly is extended to remove the table from the vicinity of the air gap both mass and length are added to the armature assembly so that the table and coil each have their own mode of vibration limiting the upper frequency of operation of the generator.

My improvement, which permits the table to be located adjacent the main air gap to reduce both the mass and length of the armature assembly and permits higher frequency operation, contemplates the placing of an auxiliary magnetic circuit at the top of the core structure 10 with a secondary air gap located adjacent the main air gap so that the opposite ends of the vibration generator have substantially the same magnetomotive potential thus eliminating the principal source of leakage flux. Such auxiliary magnetic circuit comprises a shell of a low reluctance magnetic material which includes a central piece such as the ring 52 which is coaxially arranged with respect to the armature rod 30 and the central pole piece 16 of the core structure 10. Disposed about the ring 52 is a split auxiliary direct current winding 54 that is enclosed by an outer cylindrical member 56 which is also a part of the magnetic shell. The ring 52 and the outer cylindrical member 56 are connected by two end plates 58 and 60 located at either end of the auxiliary winding 54 to complete the magnetic circuit. The innermost end plate 60 which abuts the core structure 10 is provided with a cylindrical slot forming the secondary air gap which is aligned with and has the same radial length as the main air gap in the core structure 10. As mentioned above, the auxiliary winding 56 is split, the two portions being separated by a distance which is approximately equal to the radial length of the air gaps so that the reciprocal movement of the armature coil 36 is not limited by the winding. The outermost end plate 58 is provided with arcuate apertures therein through which the fingers 42 of the armature coil 36 pass.

The ampere turns of the auxiliary winding 54 are made approximately the same as the ampere turns of the core structure winding 26 to maintain the same flux density across the air gaps which have the same length. It is to be noted in this connection that the total flux in the two air gaps is not the same due to the differences in their cross section which results from the difference in thickness of the cover plate 22 and the side plate 60. The direction of the magnetic fields in the respective air gaps is also in the same direction. For example, if the head 24 of the central pole piece 16 and the central portion of the end plate 60 are both north poles then the opposite faces of the air gaps are also south poles. Because of the low reluctance offered by the iron portions as compared with the air gaps, the connecting disc 20 of the core structure and the outermost end plate 58 of the auxiliary magnetic circuit are also south poles which are at substantially the same magnetomotive potential when the ampere turns of the windings 26 and 54 are equal. With no difference in magnetomotive potential between the ends of the generator structure it will be apparent that no magnetic field can exist so that objects on the table 32 are not subjected to destructive magnetic forces.

It should be understood that the present disclosure is for the purpose of illustration only and that this invention includes all modifications and equivalents which fall within the scope of the appended claims.

I claim:

1. Apparatus for producing a reciprocating movement in a connected load comprising a core structure having a main cylindrical air gap therein, a direct current winding for magnetizing the core structure and producing a magnetic flux across the air gap, an axially moveable armature connecting with the test load and having an alternating current carrying coil disposed in the air gap whereby a reciprocating movement is imparted to the load, and an auxiliary magnetic circuit having a secondary air gap interposed between the air gap of the core structure and the test load, said secondary air gap being concentric with and disposed adjacent the main air gap, the magnetic flux density in both the air gaps being substantially the same whereby the leakage flux in the vicinity of the table is substantially eliminated.

2. Apparatus for producing a reciprocating movement in a connected load comprising a core structure having a cylindrical air gap therein, a direct current winding for magnetizing the core structure and producing a magnetic flux across the air gap, an axially movable armature connecting with the test load and having an alternating current carrying coil disposed in the air gap whereby a reciprocating movement is imparted to the load, and an auxiliary magnetic circuit having a secondary air gap interposed between the air gap of the core structure and the test load, the radial length of the air gaps is the same and the cross sectional area of the main air gap in the core structure is at least several times as great as the corresponding area of the secondary air gap, the magnetic flux density in both the air gaps being substantially the same whereby the leakage flux in the vicinity of the table is substantially eliminated.

3. Apparatus for producing a reciprocating movement according to claim 2 wherein the core structure includes a central pole piece which is surrounded by the direct current winding, and a coaxially disposed cylindrical piece enclosing the winding, the pieces being joined at one end and separated by the main air gap at their other end.

4. Apparatus for producing a reciprocating movement according to claim 3 wherein the auxiliary magnetic circuit includes a central member coaxially disposed with respect to the central pole piece of the core structure, an auxiliary winding surrounding the central member, an outer cylindrical member enclosing the auxiliary winding, and two end plates located at either end of the auxiliary winding to connect the central member with the outer member, the innermost plate adjacent the core structure having a cylindrical slot therein which forms the secondary air gap.

5. Apparatus for producing a reciprocating movement according to claim 4 wherein the armature coil has a plurality of fingers which extend from one end thereof and the outermost plate of the auxiliary magnetic circuit has apertures through which the fingers project to connect with the armature assembly.

6. Apparatus for producing a reciprocating movement according to claim 5 wherein the armature coil is a ring of electrically conducting material forming a single short circuited turn and the fingers are formed integrally therewith by means of axially disposed slots.

7. Apparatus for producing a reciprocating movement according to claim 6 wherein a primary winding is carried upon at least one of the faces forming the main air gap to induce an alternating current in the ring.

8. Apparatus for producing a reciprocating movement according to claim 5 wherein the central pieces of the core structure and magnetic circuit have aligned apertures therethrough, an elongated rod forming a portion of the armature assembly extends through the aligned apertures, and a flexure is secured at either end of the rod to permit axial movement of the armature assembly.

References Cited in the file of this patent

UNITED STATES PATENTS

| | | |
|---|---|---|
| 1,167,366 | Fessenden | Jan. 4, 1916 |
| 1,892,826 | Bettison | Jan. 3, 1933 |
| 1,955,248 | Messick | Apr. 17, 1934 |
| 2,289,961 | Hancock | July 14, 1942 |
| 2,645,728 | Willson | July 14, 1953 |